US 8,451,802 B2

(12) United States Patent
Iyer et al.

(10) Patent No.: US 8,451,802 B2
(45) Date of Patent: May 28, 2013

(54) PERFORMING HANDOVERS FOR FIXED MOBILE CONVERGENCE NETWORKS

(75) Inventors: Jayaraman R. Iyer, Sunnyvale, CA (US); Timothy P. Stammers, Raleigh, NC (US); Parviz Yegani, Danville, CA (US); Anand Oswal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1050 days.

(21) Appl. No.: 12/045,750

(22) Filed: Mar. 11, 2008

(65) Prior Publication Data

US 2009/0232090 A1    Sep. 17, 2009

(51) Int. Cl.
*H04W 4/00* (2009.01)
(52) U.S. Cl.
USPC ............ 370/332; 370/331; 455/436; 455/439
(58) Field of Classification Search
USPC .......... 370/310–350, 352–356; 455/436–444; 709/239
See application file for complete search history.

(56) References Cited

U.S. PATENT DOCUMENTS

| 5,175,867 | A  | * | 12/1992 | Wejke et al. ................. 455/439 |
|---|---|---|---|---|
| 6,385,451 | B1 |  | 5/2002 | Kalliokulju et al. .......... 455/437 |
| 7,096,022 | B2 |  | 8/2006 | Gao et al. ..................... 455/444 |
| 7,190,668 | B1 | * | 3/2007 | Francis et al. ................ 370/229 |
| 2003/0095523 | A1 |  | 5/2003 | Korus et al. .................. 370/338 |
| 2003/0163558 | A1 |  | 8/2003 | Cao et al. ..................... 709/223 |
| 2003/0193910 | A1 |  | 10/2003 | Shoaib et al. ................. 370/331 |
| 2005/0013276 | A1 | * | 1/2005 | Ekl et al. ...................... 370/332 |
| 2007/0254661 | A1 | * | 11/2007 | Chowdhury et al. ......... 455/436 |
| 2008/0192696 | A1 | * | 8/2008 | Sachs et al. ................... 370/331 |
| 2008/0311911 | A1 | * | 12/2008 | Koodli et al. ................ 455/436 |

* cited by examiner

*Primary Examiner* — Andrew Chriss
*Assistant Examiner* — Kenan Cehic
(74) *Attorney, Agent, or Firm* — Baker Botts L.L.P.

(57) ABSTRACT

According to one embodiment, an anchor access gateway receives packets from a home agent. The packets are destined for an access terminal, and the anchor access gateway serves the access terminal. The packets are forwarded to the access terminal. The anchor access gateway receives a handoff request from a target access gateway. The handoff request requests a handover from the anchor access gateway to the target access gateway. The packets are forwarded to the target access gateway in accordance with the handoff request.

16 Claims, 2 Drawing Sheets

PERFORMING HANDOVERS FOR FIXED MOBILE CONVERGENCE NETWORKS

TECHNICAL FIELD

This present disclosure relates generally to the field of communications.

BACKGROUND

During a communication session, an access terminal may move from one network to another network. The communication session may be handed off from one access gateway to another access gateway as the access terminal moves. Known handover procedures, however, typically experience latency as the session is handed-over from one network to the other network. Moreover, known handover procedures may experience loss of the bearer path of the session.

BRIEF DESCRIPTION OF THE DRAWINGS

For a more complete understanding of the present embodiments and their features and advantages, reference is now made to the following description, taken in conjunction with the accompanying drawings, in which.

DESCRIPTION OF EXAMPLE EMBODIMENTS

Overview

In accordance with the present disclosure, disadvantages and problems associated with previous techniques for handover may be reduced or eliminated.

According to one embodiment, an anchor access gateway receives packets from a home agent. The packets are destined for an access terminal, and the anchor access gateway serves the access terminal. The packets are forwarded to the access terminal. The anchor access gateway receives a handoff request from a target access gateway. The handoff request requests a handover from the anchor access gateway to the target access gateway. The packets are forwarded to the target access gateway in accordance with the handoff request.

Description

Figure 1:
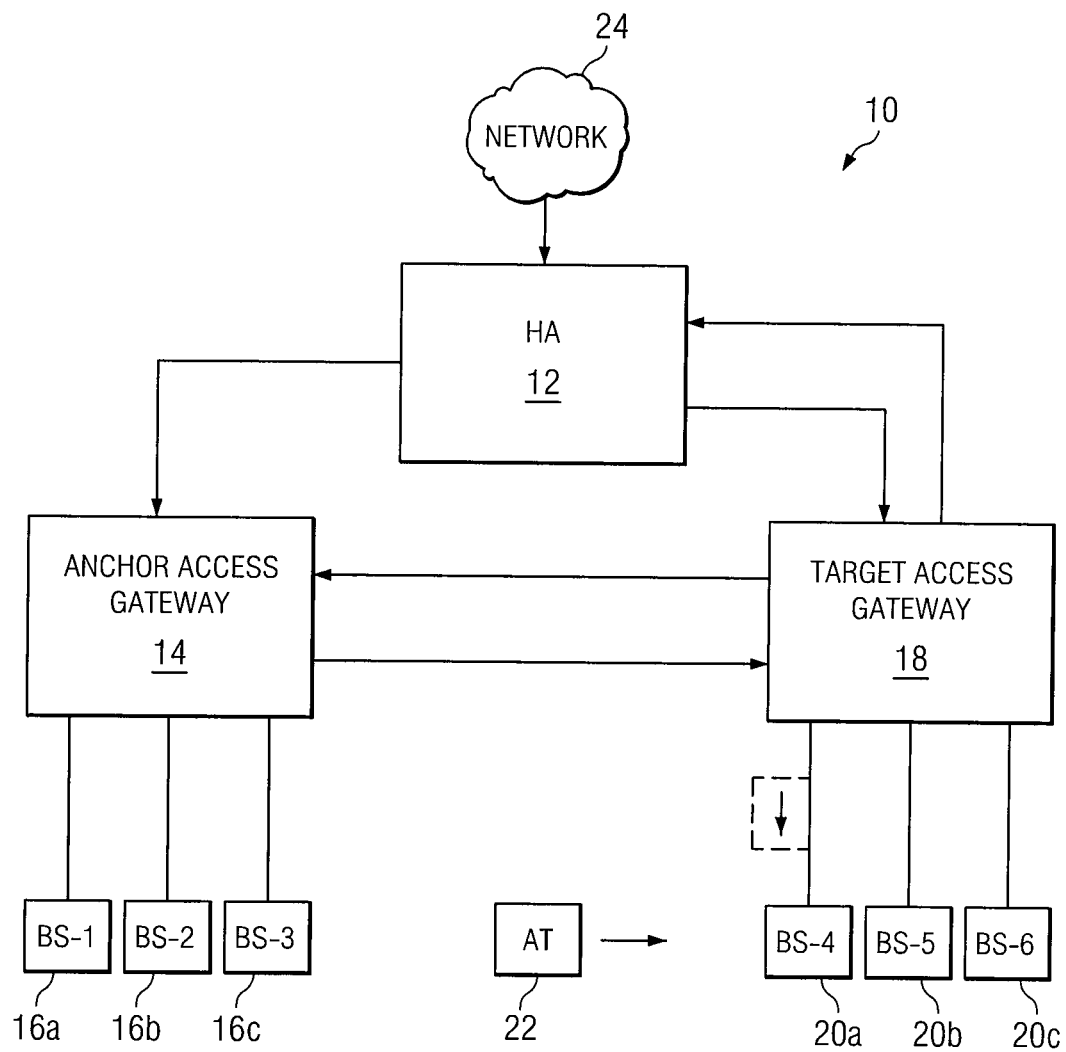
FIG. 1 illustrates an example of a communication system for performing handovers in accordance with one embodiment.
Figure 2:
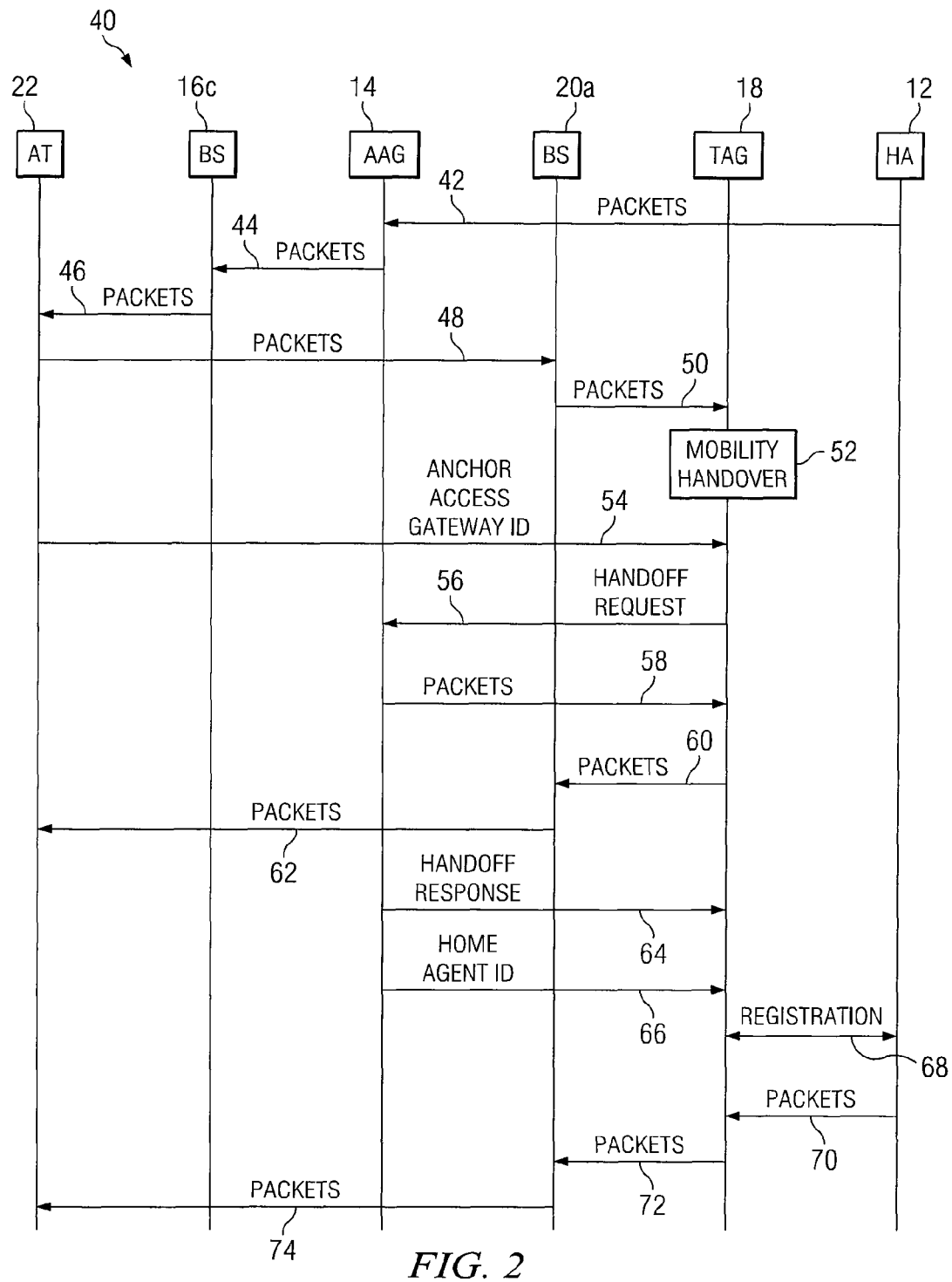
FIG. 2 is a signal flow diagram of an example of a procedure for performing handover in accordance with an embodiment.

Example embodiments and their advantages are best understood by referring to FIGS. 1 and 2 of the drawings, like numerals being used for like and corresponding parts of the various drawings.

FIG. 1 illustrates a communication system 10 for performing handovers in accordance with one embodiment. The communication system 10 includes a home agent 12 in communication with an anchor access gateway 14 and a target access gateway 18. The anchor access gateway 14 is coupled to a first base station (BS-1) 16a, a second base station (BS-2) 16b, and a third base station (BS-3) 16c. The target access gateway 18 is coupled to a fourth base station (BS-4) 20a, a fifth base station (BS-5) 20b, and a sixth base station (BS-6) 20c.

The network 24 represents a communication network that allows components such as access terminal 22 to communicate with other components. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

The home agent 12 serves as an anchor point for an access terminal 22 to access a network 24. Traffic between the access terminal 22 and the network 24 is routed through the home agent 12. In various embodiments, the home agent 12 maintains the current location of the access terminal 22 and tunnels packets destined for the access terminal 22. In various embodiments, the home agent 12 maintains mobile user registrations.

Access gateways 14 and 18 serve as gateways between the home agent 12 and the base stations 16a-16c and 20a-20c, respectively. Access gateways 14 and 18 enable packet data services to be provided to access terminal 22 in a mobile access environment provided by the base stations 16a-16c and 20a-20c, respectively. The access gateways 14 and 18 transmit and receive packets associated with the access terminal 22 to and from one or more of base stations 16a-16c and 20a-20c, respectively.

In the illustrated embodiment of FIG. 1, anchor access gateway 14 serves the access terminal 22 prior to a handover procedure. The anchor access gateway 14 may be the same as or different from a serving access gateway. Target access gateway 18 serves the access terminal 22 upon handover of the access terminal 22 from anchor access gateway 14 to target access gateway 18.

The base stations 16a-16c and 20a-20c facilitate wireless communication between the access terminal 22 and the anchor access gateway 14 and target access gateway 18, respectively. In various embodiments, the base stations 16a-16c and 20a-20c transmit and receive wireless radio signals to and from the access terminal 22.

In another embodiment, the communication system 10 may be a heterogeneous access system. In the embodiment, a target alternate access network gateway is used instead of the target access gateway 18, and an access point is used instead of base stations 20a-20c. The target alternate access gateway serves as a gateway between the home agent 12 and the access point, and the access point wirelessly communicates with the access terminal 22. In the embodiment, the anchor access gateway 14 and the target alternate access network gateway utilize different radio interfaces. Examples of radio interfaces include EVolution-Data Only (EV-DO) used by the anchor access gateway 14 and WiFi used by the target alternate access network gateway. In at least one embodiment, the target alternate access network gateway includes a packet data gateway (PDG). In the embodiment, the access terminal 22 can communicate using a radio interface associated with base stations 16a-16c and a radio interface associated with access point.

A component of system 10 may include any suitable arrangement of elements, for example, an interface, logic, memory, other suitable element, or a combination of any of the preceding. An interface receives input, send output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Logic may be encoded in one or more tangible computer-readable storage media and may perform operations when executed. Certain logic, such as a processor, may manage the operation of a component.

Examples of a processor include one or more computers, one or more microprocessors, one or more applications, other logic, or a combination of any of the preceding.

A memory stores information. A memory may comprise tangible computer-readable media and/or computer executable media, such as computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other tangible media, or a combination of any of the preceding.

Modifications, additions, or omissions may be made to system 10 without departing from the scope of the invention. The components of system 10 may be integrated or separated. Moreover, the operations of system 10 may be performed by more, fewer, or other components. Additionally, operations of system 10 may be performed using any suitable logic. As used in this document, "each" refers to each member of a set or each member of a subset of a set.

FIG. 2 is a signal flow diagram of an example procedure 40 for low-latency handover performed by the anchor access gateway 14 in accordance with an embodiment. In the illustrated embodiment, the access terminal 22 is located in an area served by one or more base stations 16a-16c and is registered with and wirelessly coupled to the third base station 16c. The home agent 12 receives packets addressed to the access terminal 22 from the network 24. The anchor access gateway 14 is registered with the home agent 12 as serving the access terminal 22. In a certain embodiments, the anchor access gateway 14 may register itself at the home agent 12 by sending a registration request, via proxy registration, or via client-based mobile IP triggers.

In a step 42, the anchor access gateway 14 receives packets for the access terminal 22 from home agent 12. In step 44, the anchor access gateway 14 forwards the packets received from the home agent 12 to the base station 16c. The base station 16c forwards the packets to the access terminal 22 in step 46.

In step 48, access terminal 22 moves to an area served by base station 20a associated with target access gateway 18, and base station 20a receives packets from access terminal 22. In step 50, base station 20a sends the packets to the target access gateway 18.

In step 52, target access gateway 18 determines that a mobility handover of access terminal 22 from anchor access gateway 14 to target access gateway 18 should be initiated.

In step 54, target access gateway 18 receives an anchor access gateway identifier from access terminal 22. The anchor access gateway identifier identifies anchor access gateway 14. In step 56, target access gateway 18 sends a handoff request to anchor access gateway 14. In various embodiments, the handoff request is a Internet Protocol (IP) Mobility Handoff Request signal.

In response to receiving the handoff request, anchor access gateway 14 forwards the packets received from the home agent 12 to the target access gateway 18 in step 58. In various embodiments, the anchor access gateway 14 forwards one copy of the packets to the access terminal 22 and another copy of the packets to the target access gateway 18. In step 60, target access gateway 18 forwards the packets to base station 20a. Base station 20a forwards the packets to access terminal 22 in step 62.

Anchor access gateway 14 forwards the second copy of the packets to target access gateway 18 during handoff in any suitable manner. In various embodiments, this provides for low-latency handover by reducing or eliminating delay that may be present in other handover procedures.

In at least one embodiment, anchor access gateway 14 forwards the copy of the packets to the target access gateway 18 until registration of target access gateway 18 with home agent 12 is complete.

In at least one other embodiment, anchor access gateway 14 monitors a radio connection between access terminal 22 and base station 16c by, for example, monitoring packet loss. If anchor access gateway 14 determines that the radio connection between base station 16c and access terminal 22 is below the acceptable level, anchor access gateway 14 begins sending the copy of the packets to target access gateway 18, and target access gateway 18.

In step 64, anchor access gateway 14 sends a handoff response to target access gateway 16. In certain embodiments, the anchor access gateway 14 forwards IP mobility context associated with the access terminal 22 to the target access gateway 18 as part of the handoff response. In certain embodiments, the handoff response is an IP Mobility Handoff Response. In step 66, anchor access gateway 14 sends a home agent identifier to target access gateway 18. The home agent identifier identifies home agent 12.

While the packets are sent to target access gateway 18 from anchor access gateway 14, target access gateway 18 registers with home agent 12 as a foreign agent in step 68. In various embodiments, target access gateway 18 registers with home agent 12 in response to an instruction from anchor access gateway 14. In some embodiments, the instruction from anchor access gateway 14 includes the handoff response and/or the home agent identifier.

Upon registration, home agent 12 begins forwarding the packets directly to target access gateway 18 in step 70. In step 70, target access gateway 18 receives the packets from home agent 12. In accordance with at least one embodiment, handover of access terminal 22 from being served by anchor access gateway 14 to being served by target access gateway 18 is supervised by a timer associated with target access gateway 18. During a predetermined timer period, target access gateway 18 may buffer the packets received from the home agent 12 to ensure correct sequencing of the packets. IP Service classification can be used to determine selective buffering.

In step 72, target access gateway 18 forwards the packets to base station 20a. Base station 20a then forwards the packets to access terminal 22 in step 74. In certain embodiments, after target access gateway 18 registers with home agent 12, home agent 12 no longer sends the packet to anchor access gateway 14, and anchor access gateway 14 no longer forwards the packets to target access gateway 18.

In still other embodiments, while anchor access gateway 14 is sending the packets to target access gateway 18, anchor access gateway 14 monitors a level of user packet activity to and from access terminal 14. If the level of packet activity is below a predetermined threshold (such as no packet activity), anchor access gateway 14 provides the target access gateway 18 with the home agent identifier. Anchor access gateway 14 further instructs target access gateway 18 to register with home agent 12, and indicates to the target access gateway 18 of when to receive packets from home agent 12. The home agent 12 then forwards the packets to the target access gateway 18.

Modifications, additions, or omissions may be made to the method of FIG. 2 without departing from the scope of the described embodiments. The method may include more, fewer, or other steps. Additionally, steps may be performed in any suitable order.

Modifications, additions, or omissions may be made to systems 10 and 30 without departing from the scope of the described embodiments. The components of systems 10 and 30 may be integrated or separated. Moreover, the operations of systems 10 and 30 may be performed by more, fewer, or other components. Additionally, operations of systems 10 and 30 may be performed using any suitable logic comprising software, hardware, other logic, or any suitable combination of the preceding. As used in this document, "each" refers to each member of a set or each member of a subset of a set.

Certain embodiments may provide one or more technical advantages. A technical advantage of one embodiment may be that it reduces latency and bearer path loss during handover. Another technical advantage of one embodiment may be that it improves the handling of delay sensitive and loss sensitive bearer traffic during network handover.

Certain embodiments may include none, some, or all of the above technical advantages. One or more other technical advantages may be readily apparent to one skilled in the art from the figures, descriptions, and claims included herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    receiving, at an anchor access gateway, a plurality of packets from a home agent, the packets destined for an access terminal, the anchor access gateway serving the access terminal;
    forwarding the packets to the access terminal;
    receiving, at the anchor access gateway, a handoff request from a target access gateway, the handoff request requesting a handover from the anchor access gateway to the target access gateway, the target access gateway identifies the anchor access gateway according to an anchor access gateway identifier received from the access terminal;
    forwarding the packets to the target access gateway in accordance with the handoff request, the forwarding the packets to the target access gateway further comprising:
        monitoring, by the anchor access gateway, a quality of a first connection between the access terminal and an anchor base station of the anchor access gateway;
        monitoring, by the anchor access gateway, a quality of a second connection between the access terminal and a target base station of the target access gateway; and
        forwarding, by the anchor access gateway, the packets if the quality of the second connection is greater than the quality of the first connection;
    monitoring packet activity between the anchor access gateway and the access terminal;
    in response to the monitored packet activity dropping below a predetermined threshold:
        instructing the target access gateway to register with the home agent; and
        communicating a home agent identifier to the target access gateway, the home agent identifier identifying the home agent.

2. The method of claim 1, further comprising:
    sending Internet Protocol (IP) mobility context information associated with the access terminal to the target access gateway.

3. The method of claim 1, wherein forwarding the packets to the target access gateway further comprises:
    detecting that the access terminal has moved to an area serviced by the target access gateway; and
    forwarding the packets from the anchor access gateway to the target access gateway in response to the detection.

4. The method of claim 1, wherein forwarding the packets to the target access gateway further comprises:
    copying the packets to yield a first copy and a second copy of the packets;
    forwarding the first copy of the packets to the target access gateway; and
    forwarding the second copy of the packets to the access terminal.

5. An apparatus comprising:
    an interface of an anchor access gateway, the interface operable to communicate with a target access gateway; and
    logic of the anchor access gateway, the logic embodied in one or more tangible media for execution and when executed operable to:
        receive a plurality of packets from a home agent, the packets destined for an access terminal, the anchor access gateway serving the access terminal;
        forward the packets to the access terminal;
        receive a handoff request from a target access gateway, the handoff request requesting a handover from the anchor access gateway to the target access gateway, the target access gateway identifies the anchor access gateway according to an anchor access gateway identifier received from the access terminal;
        forward the packets to the target access gateway in accordance with the handoff request, the forwarding the packets to the target access gateway further comprising:
            monitor a quality of a first connection between the access terminal and an anchor base station of the anchor access gateway;
            monitor a quality of a second connection between the access terminal and a target base station of the target access gateway; and
            forward the packets if the quality of the second connection is greater than the quality of the first connection;
        monitor packet activity between the anchor access gateway and the access terminal;
        in response to the monitored packet activity dropping below a predetermined threshold:
            instruct the target access gateway to register with the home agent; and
            communicate a home agent identifier to the target access gateway, the home agent identifier identifying the home agent.

6. The apparatus of claim 5, the logic further operable to:
    send Internet Protocol (IP) mobility context information associated with the access terminal to the target access gateway.

7. The apparatus of claim 5, the logic further operable to forward the packets to the target access gateway by:
    detecting that the access terminal has moved to an area serviced by the target access gateway; and
    forwarding the packets from the anchor access gateway to the target access gateway in response to the detection.

8. The apparatus of claim 5, the logic further operable to forward the packets to the target access gateway by:
    copying the packets to yield a first copy and a second copy of the packets;
    forwarding the first copy of the packets to the target access gateway; and forwarding the second copy of the packets to the access terminal.

9. A method comprising:

determining that an access terminal moves into an area serviced by a target access gateway;

identifying, by the target access gateway, an anchor access gateway serving the access terminal, the target access gateway identifies the anchor access gateway according to an anchor access gateway identifier received from the access terminal;

sending a handoff request to the anchor access gateway, the handoff request requesting a handover from the anchor access gateway to the target access gateway;

receiving, at the target access gateway, a plurality of packets from the anchor access gateway, the packets destined for the access terminal, the packets sent by the anchor access gateway in response to the anchor access gateway monitoring a quality of a first connection between the access terminal and an anchor base station of the anchor access gateway, monitoring a quality of a second connection between the access terminal and a target base station of the target access gateway, and forwarding the packets if the quality of the second connection is greater than the quality of the first connection;

receiving an instruction from the anchor access gateway to register with the home agent and a home agent identifier identifying the home agent in response to the anchor access gateway monitoring packet activity between the anchor access gateway and the access terminal and determining that the packet activity has dropped below a predetermined threshold; and receiving, at the target access gateway, the packets from the home agent in response to registering the target access gateway.

10. The method of claim 9, further comprising:

receiving Internet Protocol (IP) mobility context information associated with the access terminal from the anchor access gateway.

11. An apparatus comprising:

an interface operable to communicate with an anchor access gateway serving an access terminal; and logic embodied in one or more tangible media for execution and when executed operable to:

determine that the access terminal moves into an area serviced by a target access gateway;

identify, by the target access gateway, the anchor access gateway serving the access terminal, the target access gateway identifies the anchor access gateway according to an anchor access gateway identifier received from the access terminal;

send a handoff request to the anchor access gateway, the handoff request requesting a handover from the anchor access gateway to the target access gateway;

receive a plurality of packets from the anchor access gateway, the packets destined for the access terminal, the packets sent by the anchor access gateway in response to the anchor access gateway monitoring a quality of a first connection between the access terminal and an anchor base station of the anchor access gateway, monitoring a quality of a second connection between the access terminal and a target base station of the target access gateway, and forwarding the packets if the quality of the second connection is greater than the quality of the first connection;

receive an instruction from the anchor access gateway to register with the home agent and a home agent identifier identifying the home agent in response to the anchor access gateway monitoring packet activity between the anchor access gateway and the access terminal and determining that the packet activity has dropped below a predetermined threshold; and receive, at the target access gateway, the packets from the home agent in response to registering the target access gateway.

12. The apparatus of claim 11, the logic further operable to:

receive Internet Protocol (IP) mobility context information associated with the access terminal from the anchor access gateway.

13. The method of claim 1, further comprising communicating to the target access gateway a time to receive packets from the home agent in response to the monitored packet activity dropping below the predetermined threshold.

14. The apparatus of claim 5, the logic further operable to communicate to the target access gateway a time to receive packets from the home agent in response to the monitored packet activity dropping below the predetermined threshold.

15. The method of claim 9, further comprising receiving from the anchor access gateway a time to receive packets from the home agent in response to the anchor access gateway determining that the packet activity has dropped below the predetermined threshold.

16. The apparatus of claim 11, the logic further operable to receive from the anchor access gateway a time to receive packets from the home agent in response to the anchor access gateway determining that the packet activity has dropped below the predetermined threshold.

* * * * *